(12) United States Patent
Dewasurendra et al.

(10) Patent No.: US 9,077,444 B2
(45) Date of Patent: Jul. 7, 2015

(54) METHOD AND APPARATUS FOR LATE ENTRY IN ASYNCHRONOUS FREQUENCY HOPPING SYSTEMS USING RANDOM PERMUTATION SEQUENCES

(71) Applicant: MOTOROLA SOLUTIONS, INC, Schaumburg, IL (US)

(72) Inventors: Duminda A Dewasurendra, Plantation, FL (US); Mark A Boerger, Plantation, FL (US); Mahes M Ekanayake, Davie, FL (US); John K McKinney, Miramar, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 37 days.

(21) Appl. No.: 14/025,189

(22) Filed: Sep. 12, 2013

(65) Prior Publication Data

US 2015/0071329 A1    Mar. 12, 2015

(51) Int. Cl.
*H04B 1/69*    (2011.01)
*H04B 1/7156*    (2011.01)

(52) U.S. Cl.
CPC .................................. *H04B 1/7156* (2013.01)

(58) Field of Classification Search
CPC .............................. H04B 1/7156; H04W 56/00
USPC .................. 375/135, 138, 137, 140, 141, 146
See application file for complete search history.

(56) References Cited

U.S. PATENT DOCUMENTS

| | | | |
|---|---|---|---|
| 4,434,323 A | 2/1984 | Levine et al. | |
| 6,496,532 B1 | 12/2002 | Raitola et al. | |
| 6,934,388 B1 * | 8/2005 | Clark | 380/47 |
| 2005/0152329 A1 | 7/2005 | Krishnan et al. | |
| 2007/0133462 A1 | 6/2007 | Guey | |
| 2008/0062984 A1 | 3/2008 | Emeott et al. | |
| 2008/0101438 A1 | 5/2008 | Lee et al. | |
| 2008/0287146 A1 | 11/2008 | Liu et al. | |
| 2010/0014564 A1 * | 1/2010 | Eskildsen et al. | 375/134 |
| 2011/0128894 A1 * | 6/2011 | Boerger et al. | 370/280 |
| 2012/0135725 A1 | 5/2012 | Pinder et al. | |
| 2013/0202013 A1 * | 8/2013 | Van Stralen et al. | 375/133 |

FOREIGN PATENT DOCUMENTS

| | | |
|---|---|---|
| WO | 2005041515 A1 | 5/2005 |
| WO | 2006069301 A1 | 6/2006 |
| WO | 2012074644 A1 | 6/2012 |

* cited by examiner

*Primary Examiner* — Qutbuddin Ghulamali
(74) *Attorney, Agent, or Firm* — Daniel R. Bestor

(57) ABSTRACT

A wireless method and apparatus for late entry in frequency hopping systems that, during call setup, computes a random permutation sequence through a hop set of frequencies, chooses preamble frequencies to omit data thereon in lieu of preamble data, and swaps frequencies in the random permutation sequence such that synchronization frequencies lie next to the preamble frequencies with an expected delay such that late entrants can join. The wireless method and apparatus meets the FCC requirement of maintaining a pseudorandom hopping pattern and equal distribution of all frequencies in a hop set while guaranteeing late entry and having no effect on battery performance of radios.

17 Claims, 6 Drawing Sheets

METHOD AND APPARATUS FOR LATE ENTRY IN ASYNCHRONOUS FREQUENCY HOPPING SYSTEMS USING RANDOM PERMUTATION SEQUENCES

BACKGROUND OF THE INVENTION

The present disclosure pertains to wireless networking. In wireless networking, a frequency hopping system utilizes a method of transmitting radio signals by rapidly switching a carrier among many frequency channels, using a pseudorandom sequence known to both transmitter and receiver. In asynchronous frequency hopping systems, a radio transmits the time and frequency synchronization information in preamble (PRE) and synchronization (SYNC) slots only at the beginning of a call or communication session. Disadvantageously, if some target radios or devices (so-called late entrants) miss this initial synchronization information, they are unable to join the call or communication session at a later time. Another problem is that, even if the synchronization information is resent (e.g., sent at fixed, known frequencies) periodically among the traffic, it is not possible to ensure that the overall frequency hopping pattern stays random, as per U.S. Federal Communications Commission (FCC) requirements for frequency hopping systems. Yet another problem is that, if the synchronization information is resent using a different random hopping pattern based on a secondary hop seed (instead of using fixed frequencies) and it is interleaved among the traffic slots, it is difficult to ensure that the overall frequency hopping pattern stays random, and each of the frequencies are used with an equal chance, as per FCC requirements. This last case is also not possible because a receiver would not know what frequencies to listen to in the beginning, i.e. the PRE and SYNC always have to be on fixed, known frequencies.

Accordingly, there is a need for a method and apparatus for late entry in asynchronous frequency hopping systems using random permutation sequences.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
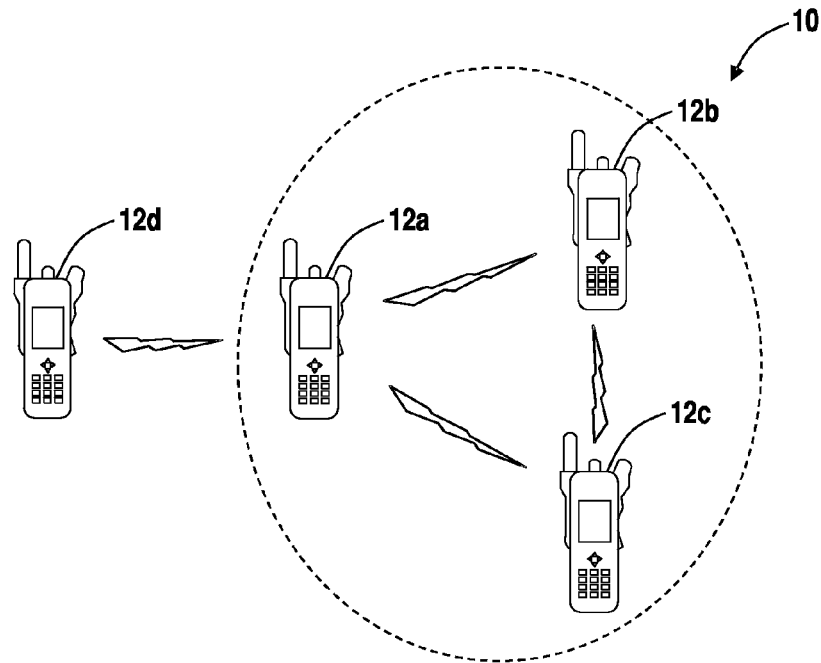
FIG. 1 is a network diagram of a wireless network using frequency hopping in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for late entry in asynchronous frequency hopping wireless communications includes generating a random permutation sequence of frequencies, 1 to N, in a hop set based on data exchanged in a connection establishment phase, wherein the hop set comprises N frequencies; finding a selected preamble frequency in the random permutation sequence; and switching a subsequent frequency in the random permutation sequence after the selected preamble frequency with a synchronization frequency, wherein the subsequent frequency is located where a late entrant expects to find the synchronization frequency containing a synchronization frame after detecting a preamble frame on the preamble frequency in the random permutation sequence.

In another exemplary embodiment, an apparatus includes an asynchronous frequency hopping radio; a processor communicatively coupled to the radio; and memory storing instructions that, when executed, cause the processor to: generate a random sequence of frequencies, 1 to N, in a hop set based on data exchanged in a connection establishment phase, wherein the hop set comprises N frequencies; find a selected preamble frequency in the random sequence; and switch, via the radio, a subsequent frequency in the random sequence after the selected preamble frequency with a synchronization frequency, wherein the subsequent frequency is located where a late entrant expects to find the synchronization frequency containing a synchronization frame after detecting a preamble frame on the preamble frequency in the random sequence.

In yet another exemplary embodiment, an asynchronous frequency hopping system includes an originator communication device initiating a call through a connection establishment phase; at least one target communication device connecting to the call during the connection establishment phase; and at least one late entry target communication device missing the connection establishment phase while connecting to the call via a late entry preamble frame and a modified synchronization frame transmitted during a traffic phase of the call; wherein the asynchronous frequency hopping system utilizes a hop set of N frequencies and, for each block of N frequencies subsequent to the connection establishment phase, a random sequence is computed through the N frequencies and swapping at least one frequency such that the modified synchronization frame is in an expected position following the late entry preamble frame.

In various exemplary embodiments, the present disclosure relates to a wireless method and apparatus for enabling late entry in asynchronous, frequency hopping systems. Further, the wireless method and apparatus meets the FCC requirement of maintaining a pseudorandom hopping pattern and equal distribution of all frequencies in a hop set. Another exemplary objective of the wireless method and apparatus is guaranteeing late entry while having no effect on battery performance and which may be implemented via a software implementation in existing systems. Variously, the wireless method and apparatus, during call setup, computes a random permutation sequence through a hop set of frequencies, chooses PRE frequencies to omit traffic data thereon in lieu of preamble data, and swaps frequencies in the random permutation sequence such that SYNC frequencies lie next to the PRE frequencies with an expected delay such that late entrants can join.

FIG. 1 is a network diagram of a wireless network 10 using frequency hopping in accordance with some embodiments. The wireless network 10 includes communication devices 12a, 12b, 12c, 12d. Note, the wireless network 10 can include other components which are omitted for simplicity such as a wireless infrastructure. In the exemplary embodiment of the wireless network 10, a call is established directly between the communication devices 12a, 12b, 12c without using an infrastructure, which is called direct mode or direct mode operation (or talkaround mode when in the presence of an infrastructure). The wireless method and apparatus described herein could also be used with a wireless infrastructure to extend range between the communication devices 12a, 12b, 12c. In an exemplary operation, the wireless network includes an originator (or transmitting radio) such as the communication device 12a that initiates a call, and one or more targets (or receiving radios) such as the communication devices 12b, 12c that receive the call. Additionally, the wireless network 10 includes the communication device 12d which is a late entrant to the call. While originating the call, the communication device 12a transmits PRE and SYNC frames to establish the random permutation sequence of frequency hopping for the call. Since the communication device 12d is late, it does not receive the PRE and SYNC frames during call setup. In variously exemplary embodiments described herein, the wireless method and apparatus provides mechanisms for the communication device 12d to enter the call late while the random permutation sequence of frequency hopping is ongoing.

The communication devices 12a, 12b, 12c, 12d can include mobile radios, smart phones, push-to-talk (PTT) radios or mobile stations, tablet devices, laptops, personal digital assistants, or any other mobile device capable of wireless communication. In the various exemplary embodiments described herein, the communication devices 12a, 12b, 12c, 12d are illustrated as mobile radios participating in a direct mode call. Those of ordinary skill in the art will recognize the wireless method and apparatus can apply to any frequency hopping systems such as, without limitation, wireless routers (WiFi), walkie talkies, cordless telephones, devices operating in the 900 MHz, 2.4 GHz, etc. bands, and the like. Furthermore, the wireless method and apparatus apply to any asynchronous frequency hopping systems whereby the random permutation sequence is determined by an originator of a call and not predetermined and known to all devices. In this manner, the communication device 12d, i.e. a late entrant, can enter the call despite missing the call setup for establishing the random permutation sequence.

Figure 2:
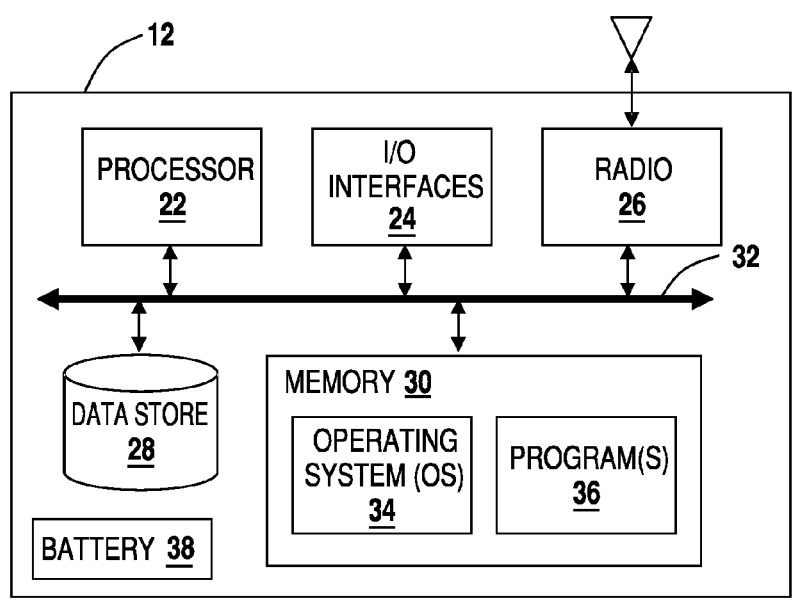
FIG. 2 is a block diagram of a communication device in accordance with some embodiments.

FIG. 2 is a block diagram of the communication device 12 in accordance with some embodiments. The communication device 12 can be a digital device that, in terms of hardware architecture, generally includes a processor 22, input/output (I/O) interfaces 24, a radio 26, a data store 28, and memory 30. It should be appreciated by those of ordinary skill in the art that FIG. 2 depicts the communication device 12 in an oversimplified manner, and a practical embodiment can include additional components and suitably configured processing logic to support known or conventional operating features that are not described in detail herein. The components (22, 24, 26, 28, and 30) are communicatively coupled via a local interface 32. The local interface 32 can be, for example but not limited to, one or more buses or other wired or wireless connections, as is known in the art. The local interface 32 can have additional elements, which are omitted for simplicity, such as controllers, buffers (caches), drivers, repeaters, and receivers, among many others, to enable communications. Further, the local interface 32 may include address, control, and/or data connections to enable appropriate communications among the aforementioned components.

The processor 22 is a hardware device for executing software instructions. The processor 22 can be any custom made or commercially available processor, a central processing unit (CPU), an auxiliary processor among several processors associated with the communication device 12, a semiconductor-based microprocessor (in the form of a microchip or chip set), or generally any device for executing software instructions. When the communication device 12 is in operation, the processor 22 is configured to execute software stored within the memory 30, to communicate data to and from the memory 30, and to generally control operations of the communication device 12 pursuant to the software instructions. In an exemplary embodiment, the processor 22 may include a mobile optimized processor such as optimized for power consumption and mobile applications. The I/O interfaces 24 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 24 can also include, for example, a serial port, a parallel port, a small computer system interface (SCSI), an infrared (IR) interface, a radio frequency (RF) interface, a universal serial bus (USB) interface, and the like. The I/O interfaces 24 can include a graphical user interface (GUI) that enables a user to interact with the communication device 12.

The radio 26 enables wireless communication to an external access device or network. Any number of suitable wireless data communication protocols, techniques, or methodologies can be supported by the radio 26, including, without limitation: RF; Land Mobile Radio (LMR); DMR; IrDA (infrared); Bluetooth; ZigBee (and other variants of the IEEE 302.15 protocol); IEEE 302.11 (any variation); IEEE 302.16 (WiMAX or any other variation); Direct Sequence Spread Spectrum; Frequency Hopping Spread Spectrum; LTE; cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; P25; proprietary wireless data communication protocols such as variants of Wireless USB; and any other protocols for wireless communication. In the various exemplary embodiments described herein, the radio 26 utilizes a frequency hopping technique according to a hop set including 1 to N frequencies, N being an integer. For example, the radio 26 can operate in the ISM band, and for frequency hopping, the FCC requires N to be at least 50 and that the random permutation sequence make equal use of the N frequencies. In an exemplary embodiment for illustration herein, N is set to 51 for the hop set although those of ordinary skill in the art will recognize other values are also contemplated for N. The radio 26 is also configured to operate in the direct mode, in an infrastructure mode, etc.

The data store 28 can be used to store data. The data store 28 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 28 can incorporate electronic, magnetic, optical, and/or other types of storage media. The memory 30 can include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 30 may incorporate electronic, magnetic, optical, and/or other types of storage media. Note that the memory 30 can have a distributed architecture, where various components are situated remotely from one another, but can be accessed by the processor 22. The software in memory 30 can include one or more software programs, each of which includes an ordered listing of executable instructions for implementing logical functions. In the example of FIG. 2, the software in the memory 30 includes a suitable operating system (O/S) 34 and programs 36. The operating system 34 essentially controls the execution of other computer programs, and provides scheduling, input-output control, file and data management, memory management, and communication control and related services.

Figure 5:
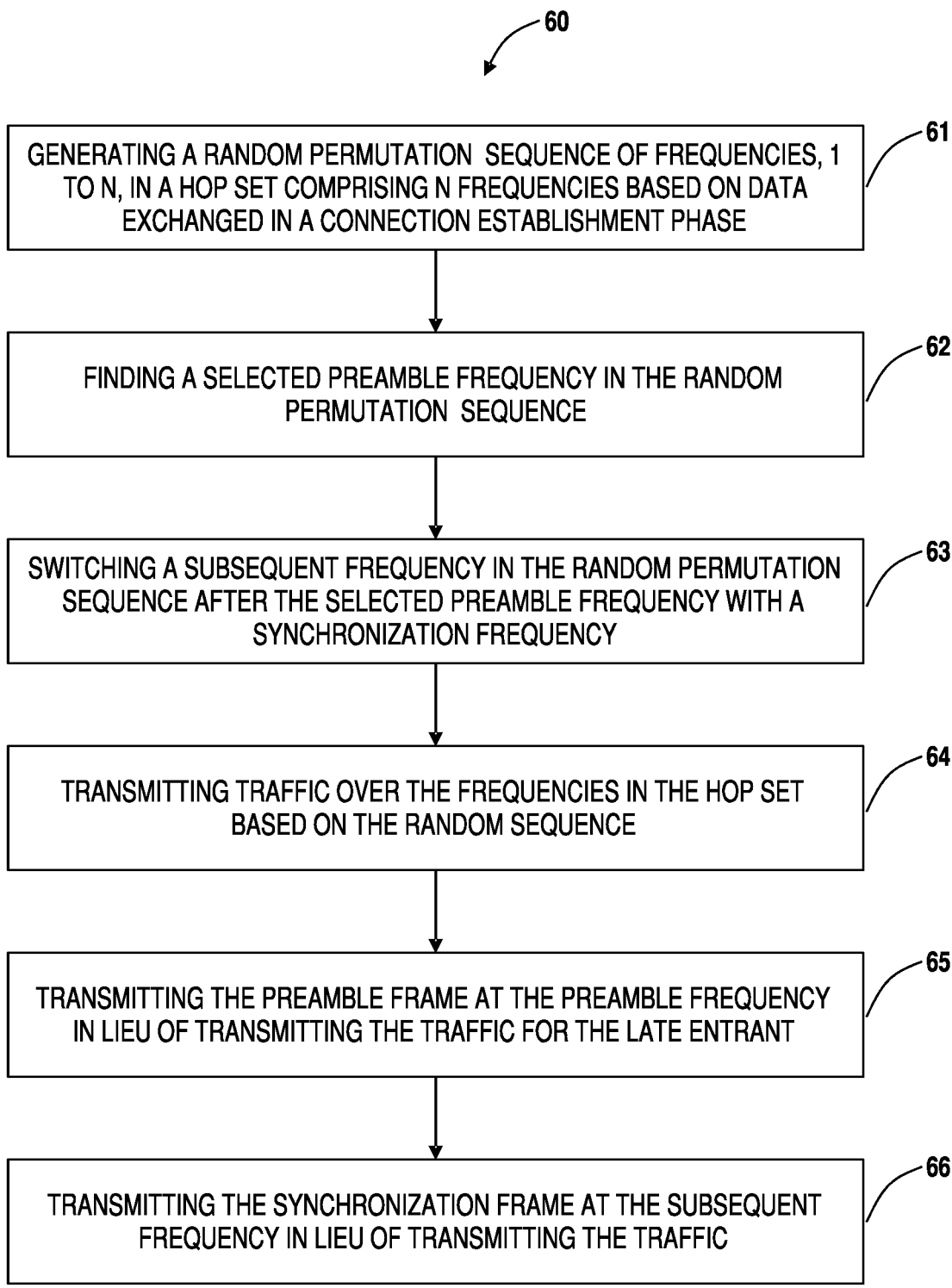
FIG. 5 is a flowchart of a wireless method for late entry in asynchronous frequency hopping in accordance with some embodiments.

The programs 36 can include various applications, add-ons, etc. configured to provide end user functionality with the communication device 12 such as implementing the wireless method and apparatus including one or more of the steps set forth in FIG. 5. The communication device 12 can also include a battery 38 or other suitable power source for the various components associated therewith. In operation, the communication device 12 can be configured to scan assigned frequencies in the hop set for preamble and sync frames for the initiation of a call. With the wireless method and apparatus, the communication device 12d, for late entry, does not need to monitor any different frequencies to scan for the preamble and sync frames thereby maintaining same battery performance as normal operation while also guaranteeing late entry.

Figure 3:
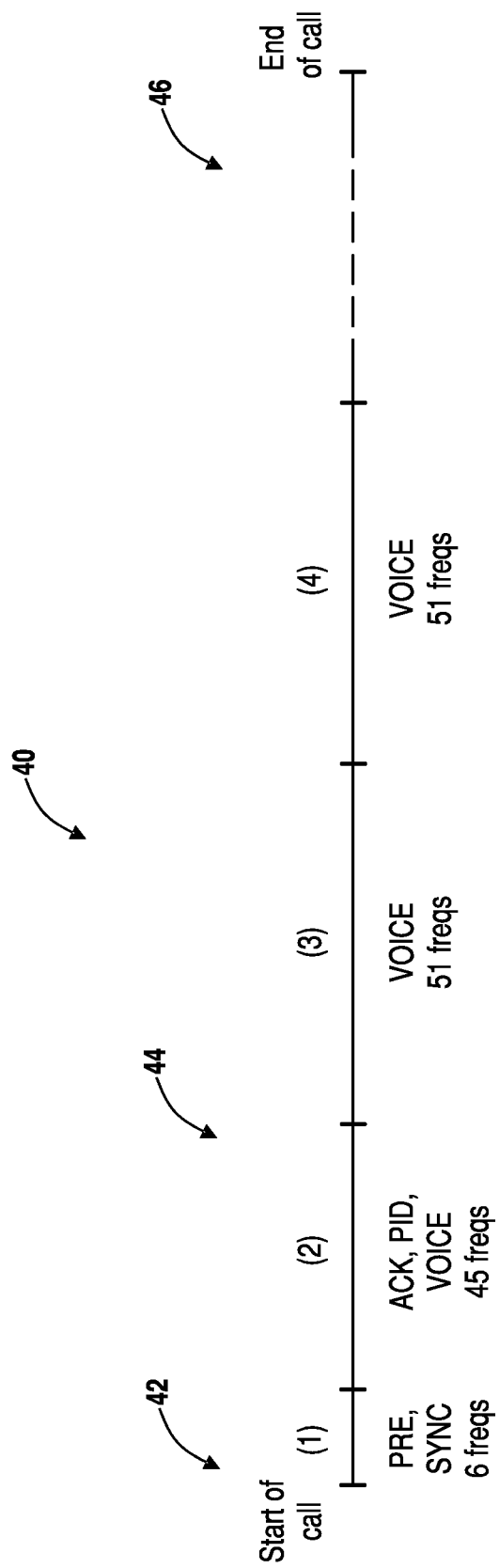
FIG. 3 is a diagram of an exemplary call using the wireless method and apparatus in accordance with some embodiments.

FIG. 3 is a diagram of an exemplary call 40 or communication session using the wireless method and apparatus in accordance with some embodiments. The exemplary call 40 can be implemented between the communication devices 12 in the wireless network 10. In general for frequency hopping, the exemplary call 40 includes a connection establishment phase 42 and a traffic phase 44. During the connection establishment phase 42, a target (e.g. each of the communication devices 12b, 12c) receives a signal from an originator (e.g. the communication device 12a) in which the target acquires the transmit frequency, bit and frame synchronization, frequency hopping seed, caller identity and message content description in sets of PRE and SYNC frames. After receiving this information, the target sends an acknowledgment (ACK) to the originator. The connection establishment phase is then completed by reception of a Private ID (PID) of the originator in a message header frame. The PID, hopping seed, and caller identity are essentially unique to each call and the associated communication devices participating in the call. For illustration of the wireless method and apparatus for enabling late entry, assume the communication device 12d misses the connection establishment phase 42.

Regarding frequency hopping, each call operates on a set of frequencies (hereinafter referred to as a hop set) within one or more frequency bands (such as the ISM band). A first group of frequencies within a particular hop set are used at the beginning of the connection establishment phase 42 to allow a target to detect the start of the transmission. After this initial detection, in the remaining portions of the connection establishment phase, in addition to the traffic phase 44 and a termination phase 46, each slot is transmitted on a sequence of frequencies within the hop set as determined by a random permutation sequence as defined herein. For illustration purposes again, the exemplary call 40 uses frequency hopping with a hop set having N=51 frequencies. Out of these 51 frequencies, six are fixed known frequencies assigned to PRE and SYNC frames, i.e. three frequencies for PRE and three frequencies for SYNC. Collectively, the PRE and SYNC frames can be referred to as call origination information for establishing an asynchronous frequency hopping call. The remaining frequencies are used for ACK, PID, voice/data, and super stop waveform (SSW). The fixed six known frequencies can also be used for voice/data as is described herein.

The exemplary call 40 is illustrated in FIG. 3 showing time versus frequencies transmitted and associated data therein. The exemplary call 40 progresses in blocks of the 51 frequencies in the hop set. For example, each frequency can be used for 90 msec and thus each block is 4.59 sec (duration of a block=51*90 msec=4.59 sec). In the exemplary wireless network 10, the communication device 12a is the originator and originates the exemplary call 40 by transmitting the PRE and SYNC frames over the first six frequencies during the connection establishment phase 42. Assume the communication devices 12b, 12c are scanning the PRE frequencies and detect a PRE frame and an associated SYNC frame subsequent to the detected PRE frame. This is described in additional detail in FIG. 4. The communication devices 12a, 12b, 12c then collectively enter the traffic phase 44, participate therein, and complete the call at the termination phase 46.

Figure 4:
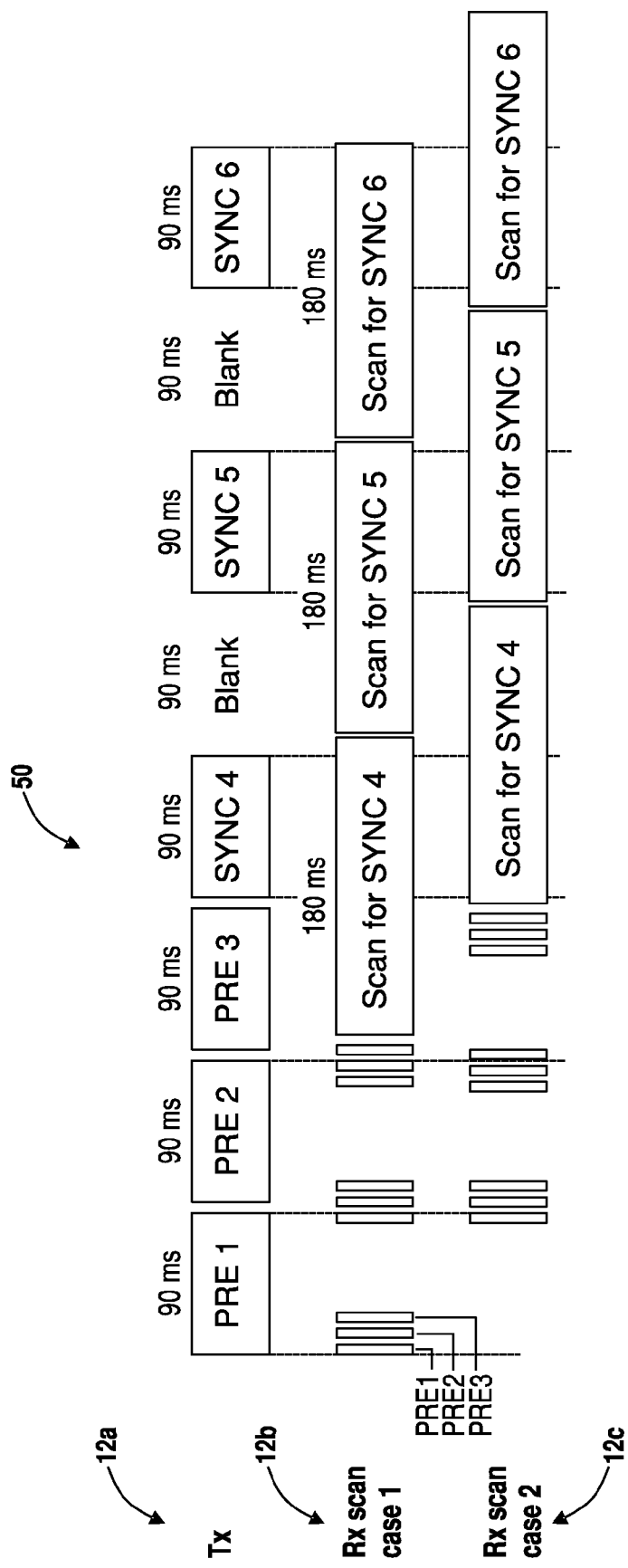
FIG. 4 is a timing diagram at the start of each call showing how the first six frequencies are transmitted and received in the exemplary call of FIG. 3 in accordance with some embodiments.

FIG. 4 is a timing diagram at the start of each call showing how the first six frequencies are transmitted and received in the exemplary call 40 in accordance with some embodiments. This specific timing is required to ensure a receiving radio does not miss any of the PRE or SYNC slot sent by the caller radio. In operation, the originator, i.e. the communication device 12a, sends the PRE and SYNC frames according to an exemplary sequence 50 in FIG. 4. That is, the communication device 12a transmits PRE frames PRE 1, PRE 2, and PRE 3 in frequency slots 1, 2, and 3 of the hop set, followed by SYNC frames SYNC 4, SYNC 5, and SYNC 6 in frequency slots 4, 5, and 6 of the hop set. PRE and SYNC frames are in pairs, i.e. PRE 1 is paired with SYNC 4, PRE 2 is paired with SYNC 5, and PRE 3 is paired with SYNC 6. Note, other exemplary embodiments are also contemplated.

Note, in this exemplary embodiment, the communication devices expect there to be a predetermined number of slots between the PRE frames and the SYNC frames, and for this reason, the communication device 12a skips transmission after the SYNC 4 and the SYNC 5 frames (indicated by Blank). That is, upon receipt of a specific PRE frame, a target knows which subsequent frequency and slot that the SYNC frame will be on. For example, the separation between PRE1 and SYNC4 is 2 slots, the separation between PRE2 and SYNC5 is 3 slots, and the separation between PRE3 and SYNC6 is 4 slots.

Actually such pairing is not necessary to increase the chance of reception in weak signal environments, e.g. Rx radios can miss PRE1, PRE2 but get PRE3 and after that it will start scanning for SYNC4, i.e. it does not wait for SYNC6 if it misses SYNC4, then it will scan for SYNC5, and so on. This way, chance of receiving a SYNC is improved. Note that all 3 SYNCS have identical information.

Concurrently with the communication device 12a transmitting, the communication devices 12b, 12c are scanning for PRE frames at the first three frequencies. Note, it only takes one pair of PRE and SYNC frames to establish a call between the communication devices 12, and the extra PRE and SYNC frames are used for resiliency in the connection establishment phase 42. In this exemplary embodiment, the communication device 12b detects the PRE1 frame from the communication device 12a, and waits two slots to detect the SYNC4 frame. The communication device 12c detects the PRE2 frame from the communication device 12a, and waits three slots to detect the SYNC5 frame (alternatively, the communication device 12c could detect the SYNC4 or SYNC6 frame as well). Disadvantageously, the communication device 12d misses each of the PRE frames, being a late entrant to the exemplary call 40.

Referring back to FIG. 3, the exemplary call 40 can be segmented into blocks (1), (2), (3), and (4). The block (1) includes the first six frequencies in the hop set and is part of the connection establishment phase 42 as described in FIG. 4. The block (2) includes the ACK and PID, ending the connection establishment phase 42, and then beginning the traffic phase 44. The block (2) includes the remaining 45 frequencies in the hop set besides the first six frequencies which were used for the connection establishment phase 42 in block (1). The block (2) can include the remaining 45 frequencies in a random sequence. Starting at the block (3) and onwards through block (4) until the end of the exemplary call 40, a random permutation sequence of length 51 is generated at the beginning of each block. The random permutation sequence is based on a hop seed that is exchanged between the communication devices 12 during the connection establishment phase 42 such as through data transmitted in the SYNC frames.

FIG. 5 is a flowchart of a wireless method 60 for late entry in asynchronous frequency hopping in accordance with some embodiments. The wireless method 60 can be implemented in the wireless network 10 of FIG. 1 by one or more of the communication devices 12. Variously, the wireless method 60 allows a late entrant, e.g. the communication device 12d, to participate in a call despite missing the connection establishment phase 42 where a hop seed is exchanged. Subsequent to the connection establishment phase 42, the wireless method 60 includes generating a random permutation sequence of frequencies, 1 to N, in a hop set comprising N frequencies based on data exchanged in a connection establishment phase (step 61). Optionally, N is greater than or equal to 50, such as, for example N=51, to meet FCC requirements. The random permutation sequence can be out of the N numbers where each number is used once (representing the N frequencies in the hop set). The random permutation sequence can be generated locally at each of the targets and the originator based on a common hop seed known to each based on the connection establishment phase 42.

For example, the random permutation sequence can be computed as the sorted index i of a random sequence of numbers, given by the function [sorted_ numbers, i]=sort (rand(1,N)). Here the "rand( )" function generates a sequence of random integers ranging from 1 to N, N being the number of frequencies in the hop set. The "sort( )" function sorts them in ascending order and returns the original indices of the sorted numbers in i. Hence, the index i is a unique permutation sequence based on the seed value (hop seed) used for random number generation in "rand( )" function. Hence, one can ensure that once the initial hop seed is exchanged, both targets and the originator generate the same permutation sequence from then on. Of the N frequencies, M frequencies are chosen as designated PRE frequencies and SYNC frequencies, M<<N. For example, M=1 to 6 where M=1 to 3 are the PRE frequencies and M=4 to 6 are the SYNC frequencies. Of course, other embodiments are also contemplated. For example, assuming N=51 and referencing the exemplary call 40, the first 6 frequencies (1-6) used in block 1 to send PRE and SYNC are excluded and the numbers 7-51 are used to generate the sequence for the block (2). The above mechanisms can ensure that all 51 frequencies are used equally within each block of 51 frequencies.

In the connection establishment phase 42, all M frequencies are used for transmission of PRE frames and SYNC frames. As part of the wireless method 60 for late entrants, a subset of the M frequencies are chosen to continue transmission of a PRE frame and SYNC frame during the traffic phase, i.e. in the exemplary call 40 during the blocks (3) onwards. That is, traffic is omitted from these frequencies when they appear in the random permutation sequence. Instead, the PRE frame and a SYNC synchronization frame is transmitted such that the late entrant can join the call based on a modified hop seed. The modified hop seed enables the late entrant to correctly compute the random permutation sequence in progress. After the random permutation sequence is generated, the wireless method 60 includes finding a selected PRE frequency in the random permutation sequence (step 62). To address the late entry problem, once the random permutation sequence is generated at the beginning of each block of N=51 frequencies, a search is done to see where the PRE frequencies are located.

Within each block during the traffic phase, the wireless method 60 sends one or more PRE and SYNC pairs for late entry. In an exemplary embodiment, the wireless method 60 chooses only one PRE and SYNC pair for late entry. This includes stealing traffic data during the traffic phase to retransmit the PRE and SYNC pair for late entry. Note that by stealing two frequencies out of N (e.g., N=51) for this purpose will cause a minor degradation of the voice quality, although the effect is significantly lower due to error correction capabilities (e.g., via forward error correction (FEC)) introduced in the channel. For example, the choice of one pair out of the three available pairs within each block can be chosen alternatively, or based on a secondary hop seed such that both the targets and originator are aware of it. Note, more than three pairs can be chose, e.g. PRE3 and SYNC5, etc., but whatever is chosen, the timing such as illustrated in FIG. 4 can be maintained.

For a late entrant target receiver to correctly receive the SYNC frame after the PRE frame, the location of the SYNC frame with respect to the PRE frame needs to be the same as the initial transmission during the connection establishment phase. This ensures that the scanning method at the late entrant target receiver needs no changes when this method is used. The wireless method 60 includes switching a subsequent frequency in the random permutation sequence after the selected PRE frequency with a SYNC frequency (step 63). The subsequent frequency is located where a late entrant expects to find the SYNC frequency with a SYNC frame after detecting a PRE frame on the PRE frequency in the random permutation sequence. For example back in FIG. 4, if the PRE2 frame is used for the selected preamble frequency, the SYNC5 frame can be located three frequencies after the PRE2 frequency or about 360 msec from the start of the PRE2 frequency slot.

The wireless method 60 can include transmitting traffic over the frequencies in the hop set based on the random permutation sequence (step 64). Optionally, the traffic can be voice traffic which can include a three slot voice frame per frequency in the hop set with built in FEC coding and redundancies. The wireless method 60 can include transmitting the preamble frame at the preamble frequency in lieu of transmitting the traffic for the late entrant (step 65) and transmitting the synchronization frame at the subsequent frequency in lieu of transmitting the traffic (step 66). Now the transmitter will transmit a late entry PRE/SYNC pair in the above chosen slots instead of usual voice slots, the tradeoff is a slight degradation of voice due to corruption of voice frames (maximum 2 frames out of N). However, in an exemplary embodiment, each slot is part of a three slot voice frame and the built in FEC coding and redundancies within each voice frame is capable of correcting these errors to a certain extent. The wireless method 60 can include processing the traffic with missing traffic from the PRE frequency and the SYNC frequency accommodated by redundancies and forward error correction coding.

The wireless method 60 can also include scanning the PRE frequency at the late entrant; receiving the PRE frame and the SYNC frame; and joining a call by the late entrant despite missing the initial connection establishment phase. Again, the late entrant sees the PRE frame on its expected PRE frequency based on a normal, non-modified scanning pattern. Following the late entrant preamble frame, the late entrant expects the SYNC frame on a predetermined time and frequency after the PRE frame.

To further prevent degradation, the wireless method 60 can include transmitting the traffic during the hop set over N−2 frequencies; and implementing a buffer at targets to avoid traffic disruption due to loss of traffic during the PRE frequency and the SYNC frequency. For example, if the traffic is voice, the wireless method 60 can include squeezing voice bits from N slots to N−2 slots (e.g., reducing some FEC bits) and implementing a voice buffer at receivers to avoid audio holes.

Optionally, the wireless method 60 can include detecting a silent period of the traffic; and withholding transmission of the traffic comprising the silent period during the preamble frequency and the synchronization frequency. This can include a slight modification to the wireless method 60 where, upon detection of silence, the preamble frequency is swapped to the next frequency in line in the random permutation sequence as well as the synchronization frequency as well. This includes switching both the PRE and SYNC frequencies in the random sequence. This requires an indicator in a current frame to indicate that the next frame is silent or not such that each of the targets and originators know to adjust accordingly.

In FIG. 3, the wireless method 60 can be implemented in blocks (3) onward. Note, it is not required to implement the wireless method 60 in blocks (1) and (2) as this hop set includes the connection establishment phase 42. Assume again that N=51 such that each block is approximately 4.5 sec. With the aforementioned systems and methods, if calls are mostly less than 4.5 sec (using less than N=51 slots), this will cause an uneven, higher usage of the M PRE and SYNC frequencies, i.e. frequencies 1 to 6. To avoid this issue, only for calls shorter than 4.5 sec, filler slots can be added such that the minimum call length remains N slots and all the N frequencies are transmitted with a uniform distribution over time, as per FCC requirements. Since most of the calls are longer than 4.5 seconds, such filler slots may not be required often. Even if they are required, the extra length will be at most 1-2 seconds, hence no concerns regarding overcrowding of the system due to filler slots.

Figure 6:
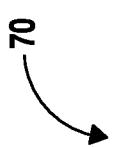
FIG. 6 is a table of an exemplary operation of the wireless method of FIG. 5 in accordance with some embodiments.

FIG. 6 is a table of an exemplary operation 70 of the wireless method 60 in accordance with some embodiments. Again, the exemplary operation 70 is illustrated with N=51 and with PRE2 and SYNC5 chosen as the selected PRE and SYNC frequencies. A first row in the table indicates an originally generated random permutation sequence at all of the targets and the originator based on the hop seed. The first row highlights the locations of the PRE and SYNC frequencies (i.e., 6, 4, 2, 3, 5, etc.). A second row highlights the chosen PRE and SYNC pair, i.e. PRE2 and SYNC5. As can be seen in the second row, the SYNC5 is not located where it should be (per FIG. 4, for example, the SYNC5 should be located where frequency 25 is). Finally, a third row illustrates a modified random permutation sequence where frequency 5 and 25 are swapped according to the wireless method 60.

This is because for the PRE and SYNC pair picked in FIG. 6 (i.e. PRE frequency 2, SYNC frequency 5), the separation is expected to be three slots (270 msec) as shown in FIG. 4. Note that this separation including the 90 msec blanks in between the SYNC slots are required to ensure that during the receiver scan, it always has a chance to detect all the SYNC slots (for redundancy), given the location of detection of PRE within the 90 msec Tx period. The wireless method 60 needs to ensure the same separation in the late entry PRE and SYNC as well, in order to avoid complicated changes to the Rx scanning process and thus operates without modification thereof. For this purpose, in the original sequence generated in the block shown in FIG. 4, the wireless method 60 swaps frequency 25 with frequency 5 (as shown in third row of the table). This ensures that the SYNC frequency 5 is transmitted 270 msec after PRE frequency 2. The randomness of the original random permutation sequence remains intact, because the swapping operation that is performed is also initiated at random points of the sequence.

Figure 7:
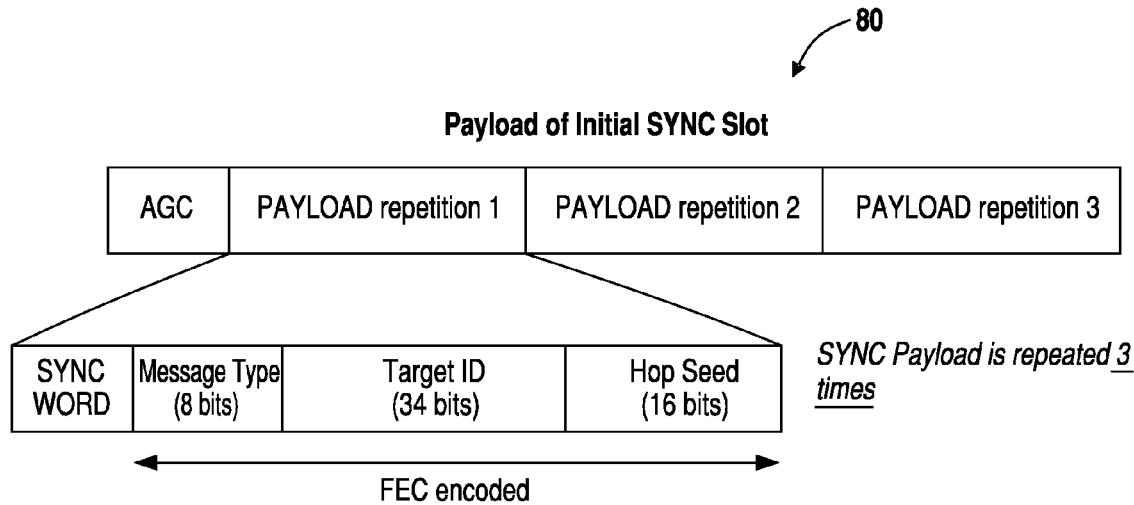
FIG. 7 is a block diagram of an initial synchronization frame used in the connection establishment phase in accordance with some embodiments.
Figure 8:
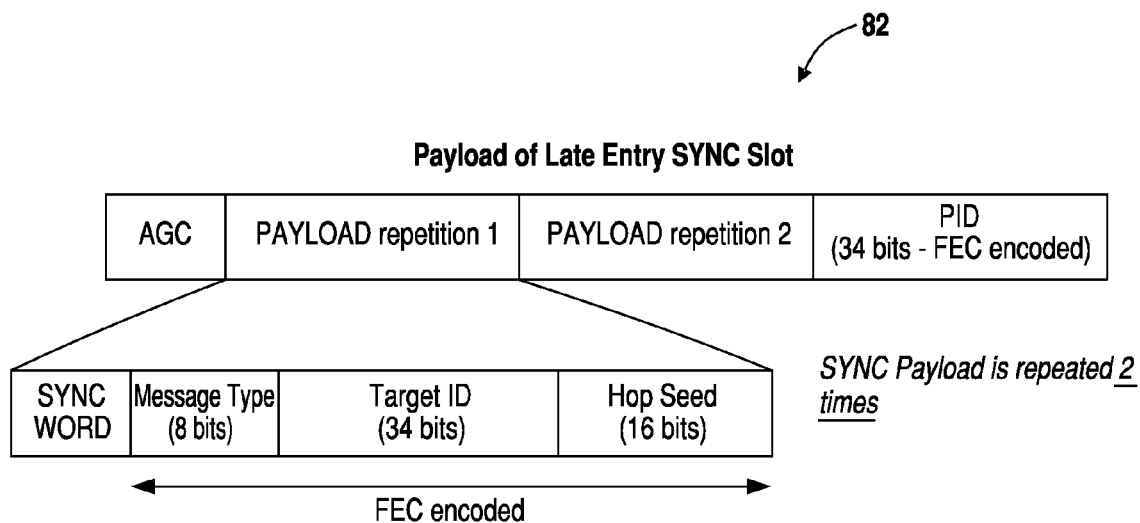
FIG. 8 is a block diagram of a modified synchronization frame used for late entry in accordance with some embodiments.

FIG. 7 is a block diagram of an initial SYNC frame 80 used in the connection establishment phase and FIG. 8 is a block diagram of a modified SYNC frame 82 used for late entry in accordance with some embodiments. The initial call synchronization during the connection establishment phase involves receiving ACK and Transmitting PID from the originator, in addition to the PRE and SYNC. However, during late entry, ACK is not required because the group call considered here has been already started, based on the initial ACK from at least one group member. Moreover, the wireless method 60 needs to indicate to the target that this is a late entry scenario and hence no need to transmit ACK on its end. Also, stealing additional slots to transmit PID within the voice call will further degrade the voice quality. Hence, the wireless method 60 can further include transmitting the SYNC frame as a modified SYNC frame comprising a modified hop seed and a private identifier.

In FIG. 7, the initial SYNC frame 80 includes three repetitions of the same information bits for redundancy, thereby increasing the sensitivity of the SYNC slot at the receiver. However, such maximum sensitivity is not expected with the late entry PRE and SYNC because they will be transmitted every X seconds or so, i.e. during each block. Hence the modified SYNC frame 82 will only have two repetitions of the SYNC payload, and instead of the third repetition, it will carry the PID payload. This alleviates the need for stealing additional slots for the PID during voice.

The differences between initial SYNC frame 80 and the modified SYNC frame 82 include the following. First, the modified SYNC frame 82 carries an adjusted hop seed which will allow late entrants to enter the conversation immediately following the SYNC timeslot. That is, the adjusted hop seed is modified from the original hop seed so the late entrants can correctly compute future random permutation sequences. Second, the modified SYNC frame 82 contains a unique Message Type to let the late entrants know they are entering late, in which case the late entrants will not send an ACK or look to receive PID information in following bursts. Also, this will indicate that they need to look for PID at the latter portion of the SYNC slot. Third, the modified SYNC frame 82 contains the PID of the caller who initiated this call.

Advantageously, the wireless method and apparatus requires no scanning changes in the receiver, hence the radio battery life is not affected through additional scanning. Also, the wireless method and apparatus ensures that the hopping pattern stays random at all times as required by the FCC. This improves upon existing and other proposed methods that insert fixed frequencies for PRE and SYNC in the middle of the random hopping sequence. Those methods violate the randomness of the sequence, which is an important requirement in asynchronous frequency hopping systems. Also, the wireless method and apparatus ensures that all frequencies in the chosen hop set are used with an equal chance as required by the FCC. Finally, adding PRE and SYNC frequencies in the middle of the voice sequence does not violate the uniform hopping requirements of the FCC.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for late entry in asynchronous frequency hopping wireless communications, the method comprising:
during a traffic phase of a call, generating a random permutation sequence of frequencies, 1 to N, in a hop set based on data exchanged in a connection establishment phase of the call, wherein the hop set comprises N frequencies;
finding a selected preamble frequency in the generated random permutation sequence at which to transmit a late entrant preamble frame for late entrant devices;
finding a selected synchronization frequency in the generated random permutation sequence at which to transmit a late entrant synchronization frame associated with the late entrant preamble frame;

finding a subsequent frequency in the generated random permutation sequence after the selected preamble frequency, wherein the subsequent frequency is located in the generated random permutation sequence where late entrant devices expect to find the late entrant synchronization frame associated with the late entrant preamble frame relative to the location of the selected preamble frequency in the generated random permutation sequence;

switching the subsequent frequency in the generated random permutation sequence with the selected synchronization frequency in the generated random permutation sequence to form a modified random permutation sequence; and transmitting traffic, the late entrant preamble frame, and the late entrant synchronization frame over the frequencies, 1 to N, in accordance with the modified random permutation sequence.

2. The method of claim 1, further comprising:
transmitting the late entrant preamble frame at the selected preamble frequency in the modified random permutation sequence in lieu of transmitting a portion of the traffic; and
transmitting the late entrant synchronization frame at the selected synchronization frequency in the modified random permutation sequence in lieu of transmitting a portion of the traffic.

3. The method of claim 2, further comprising:
scanning the preamble frequency at the late entrant;
receiving the late entrant preamble frame and the late entrant synchronization frame; and
joining the call by the late entrant despite missing the initial connection establishment phase.

4. The method of claim 2, further comprising:
transmitting the traffic during the hop set over N−2 frequencies; and
implementing a buffer at targets to avoid traffic disruption due to loss of traffic during the selected preamble frequency and the selected synchronization frequency in the modified random permutation sequence.

5. The method of claim 2, further comprising:
processing the traffic with the missing portions of traffic from the selected preamble frequency and the selected synchronization frequency in the modified random permutation sequence accommodated by redundancies and forward error correction coding.

6. The method of claim 2, further comprising:
detecting a silent period of the traffic; and
withholding transmission of the traffic comprising the silent period during the selected preamble frequency and the selected synchronization frequency in the modified random permutation sequence.

7. The method of claim 2, further comprising:
transmitting the late entrant synchronization frame as a modification of a synchronization frame transmitted during the call establishment phase comprising a modified hop seed and a private identifier.

8. The method of claim 2, further comprising:
indicating to late entrant devices via the late entrant synchronization frame that no acknowledgment is required and providing a private identifier in the late entrant synchronization frame that was not included in synchronization frames transmitted during the call establishment phase.

9. An apparatus supporting late entry in asynchronous frequency hopping wireless communications, the apparatus comprising:
an asynchronous frequency hopping radio;
a processor communicatively coupled to the radio; and
memory storing instructions that, when executed, cause the processor to:
during a traffic phase of a call, generate a random permutation sequence of frequencies, 1 to N, in a hop set based on data exchanged in a connection establishment phase of the call, wherein the hop set comprises N frequencies;
find a selected preamble frequency in the generated random permutation sequence at which to transmit a late entrant preamble frame for late entrance devices;
find a selected synchronization frequency in the generated random permutation sequence at which to transmit a late entrant synchronization frame associated with the late entrant preamble frame;
find, a subsequent frequency in the generated random permutation sequence after the selected preamble frequency, wherein the subsequent frequency is located in the generated random permutation sequence where late entrant devices expect to find the late entrant synchronization frame associated with the late entrant preamble frame relative to the location of the selected preamble frequency in the generated random permutation sequence;
switch the subsequent frequency in the generated random permutation sequence with the selected synchronization frequency in the generated random permutation sequence to form a modified random permutation sequence; and
transmit traffic, the late entrant preamble frame, and the late entrant synchronization frame, via the radio, over the frequencies, 1 to N, in accordance with the modified random permutation sequence.

10. The apparatus of claim 9, wherein the instructions, when executed, further cause the processor to:
transmit, via the radio, the late entrant preamble frame at the selected preamble frequency in the modified random permutation sequence in lieu of transmitting a portion of the traffic; and
transmit, via the radio, the late entrant synchronization frame at the selected synchronization frequency in the modified random permutation sequence in lieu of transmitting a portion of the traffic.

11. The apparatus of claim 10, wherein the instructions, when executed, further cause the processor to:
transmit, via the radio, the traffic during the hop set over N−2 frequencies; and
implement a buffer to avoid traffic disruption due to loss of traffic during the selected preamble frequency and the selected synchronization frequency in the modified random permutation sequence.

12. The apparatus of claim 10, wherein the instructions, when executed, further cause the processor to:
process the traffic with the missing portions of traffic from the selected preamble frequency and the selected synchronization frequency in the modified random permutation sequence accommodated by redundancies and forward error correction coding.

13. The apparatus of claim 10, wherein the instructions, when executed, further cause the processor to:
detect a silent period of the traffic; and
withhold transmission of the traffic, via the radio, comprising the silent period during the selected preamble frequency and the selected synchronization frequency in the modified random permutation sequence.

14. The apparatus of claim 10, wherein the instructions, when executed, further cause the processor to:
transmit, via the radio, the late entrant synchronization frame as a modification of a synchronization frame transmitted during the call establishment phase comprising a modified hop seed and a private identifier.

15. The apparatus of claim 10, wherein the instructions, when executed, further cause the processor to:
indicate to late entrant devices via the late entrant synchronization frame that no acknowledgment is required and providing a private identifier in the late entrant synchronization frame that was not included in synchronization frames transmitted during the call establishment phase.

16. An asynchronous frequency hopping system, comprising:
an originator communication device initiating a call through a connection establishment phase;
at least one target communication device connecting to the call during the connection establishment phase; and
at least one late entry target communication device missing the connection establishment phase and connecting to the call via a late entry preamble frame and a late entry synchronization frame transmitted by the originator communication device during a traffic phase of the call;
wherein during the traffic phase subsequent to the connection establishment phase, the originator communication device:
generates a random permutation sequence of frequencies, N, in a hop set based on data exchanged in the connection establishment phase of the call, wherein the hop set comprises N frequencies;
finds a selected preamble frequency in the generated random permutation sequence at which to transmit the late entrant preamble frame for late entrant devices;
finds a selected synchronization frequency in the generated random permutation sequence at which to transmit the late entrant synchronization frame associated with the late entrant preamble frame;
finds a subsequent frequency in the generated random permutation sequence after the selected preamble frequency, wherein the subsequent frequency is located in the generated random permutation sequence where late entrant devices expect to find the late entrant synchronization frame associated with the late entrant preamble frame relative to the location of the selected preamble frequency in the generated random permutation sequence;
switches the subsequent frequency in the generated random permutation sequence with the selected synchronization frequency in the generated random permutation sequence to form a modified random permutation sequence; and
transmits traffic, the late entrant preamble frame, and the late entrant synchronization frame over the frequencies, N, in accordance with the modified random permutation sequence.

17. The asynchronous frequency hopping system of claim 16, wherein the random permutation sequence comprises a randomly generated sequence at each of the originator communication device and the at least one target communication device based on a common hop seed exchanged during the connection establishment phase.

* * * * *

UNITED STATES PATENT AND TRADEMARK OFFICE
CERTIFICATE OF CORRECTION

| | |
|---|---|
| PATENT NO. | : 9,077,444 B2 |
| APPLICATION NO. | : 14/025189 |
| DATED | : July 7, 2015 |
| INVENTOR(S) | : Duminda A. Dewasurendra et al. |

It is certified that error appears in the above-identified patent and that said Letters Patent is hereby corrected as shown below:

IN THE TITLE PAGE:

In Item (71), under "Applicant," in Column 1, Line 1, delete "INC," and insert -- INC., --, therefor.

In Item (72), under "Inventors," in Column 1, Line 1, delete "A" and insert -- A. --, therefor.

In Item (72), under "Inventors," in Column 1, Line 2, delete "A" and insert -- A. --, therefor.

In Item (72), under "Inventors," in Column 1, Line 3, delete "M" and insert -- M. --, therefor.

In Item (72), under "Inventors," in Column 1, Line 4, delete "K" and insert -- K. --, therefor.

IN THE SPECIFICATION:

In Column 5, Line 28, delete "(O/S)" and insert -- (OS) --, therefor.

In Column 7, Line 5, delete "SYNCS" and insert -- SYNCs --, therefor.

IN THE CLAIMS:

In Claim 9, Column 14, Line 20, delete "find," and insert -- find --, therefor.

Signed and Sealed this
Fifth Day of July, 2016

Michelle K. Lee
*Director of the United States Patent and Trademark Office*